Patented Oct. 10, 1944

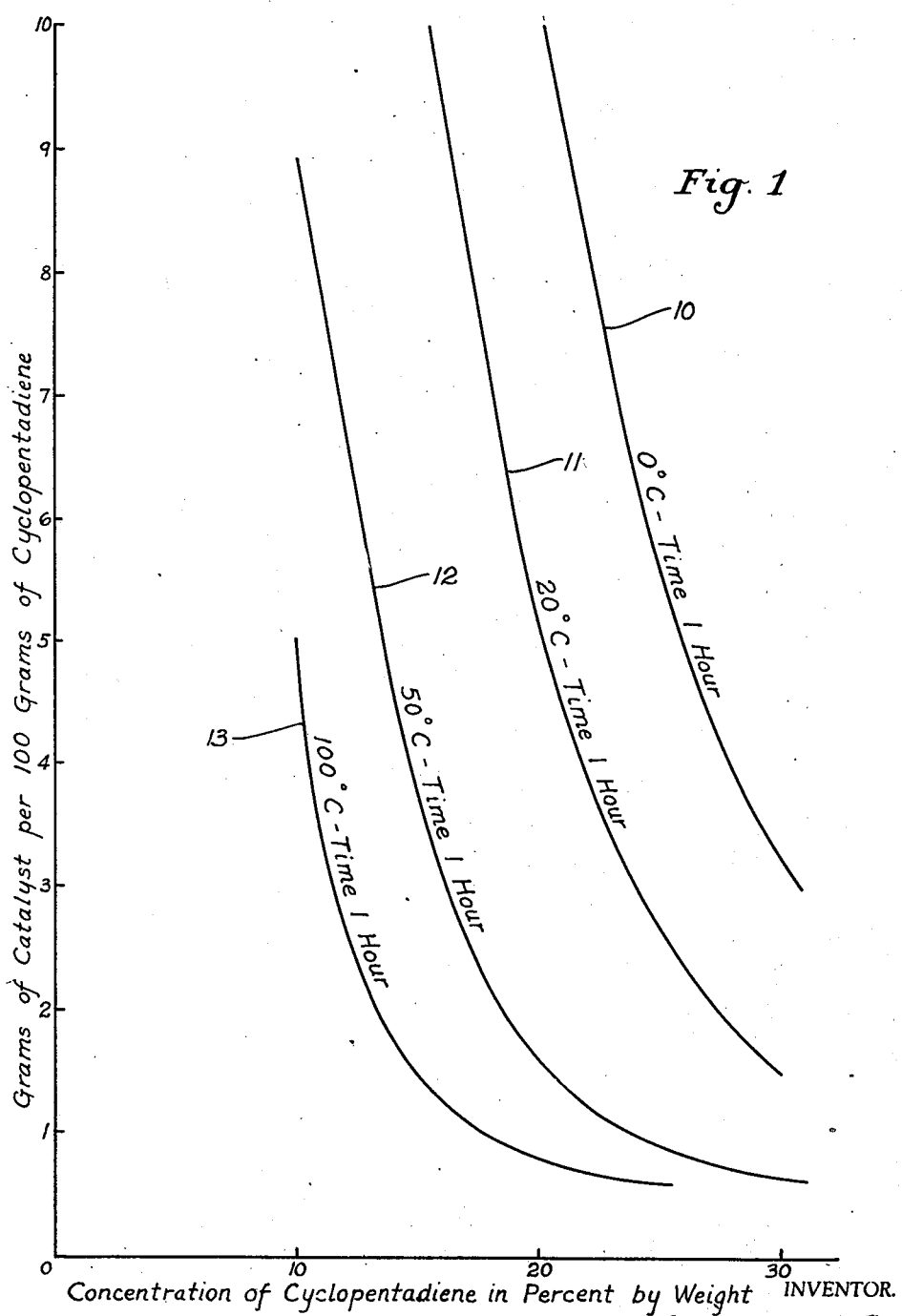

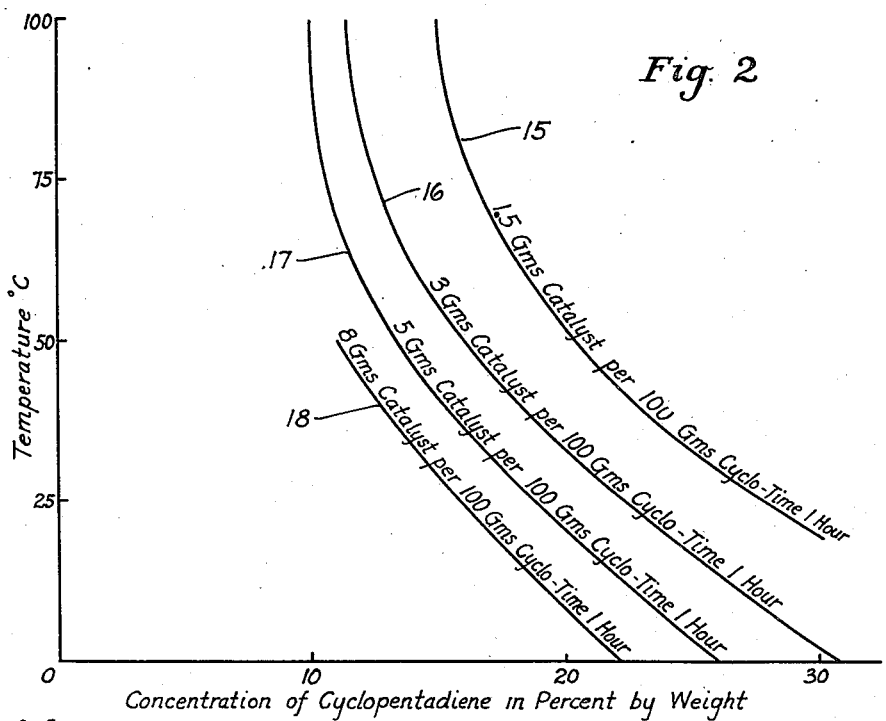
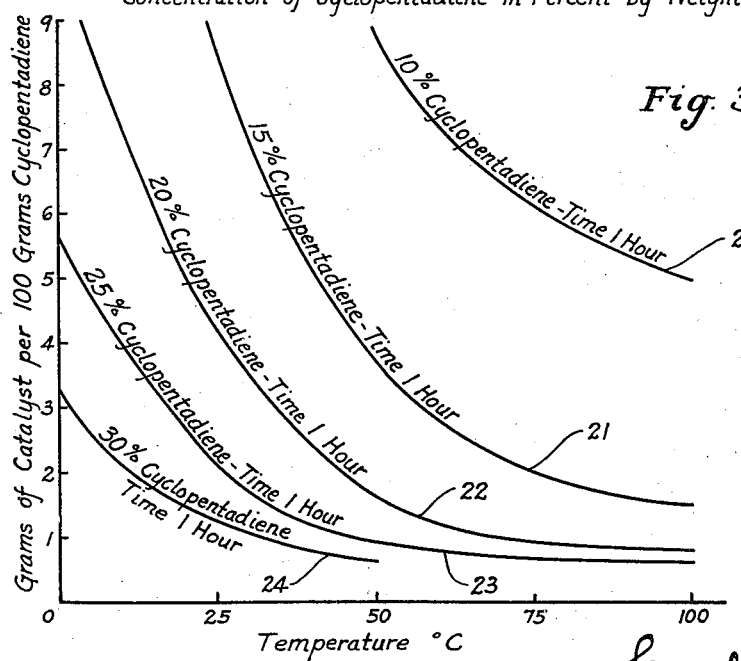

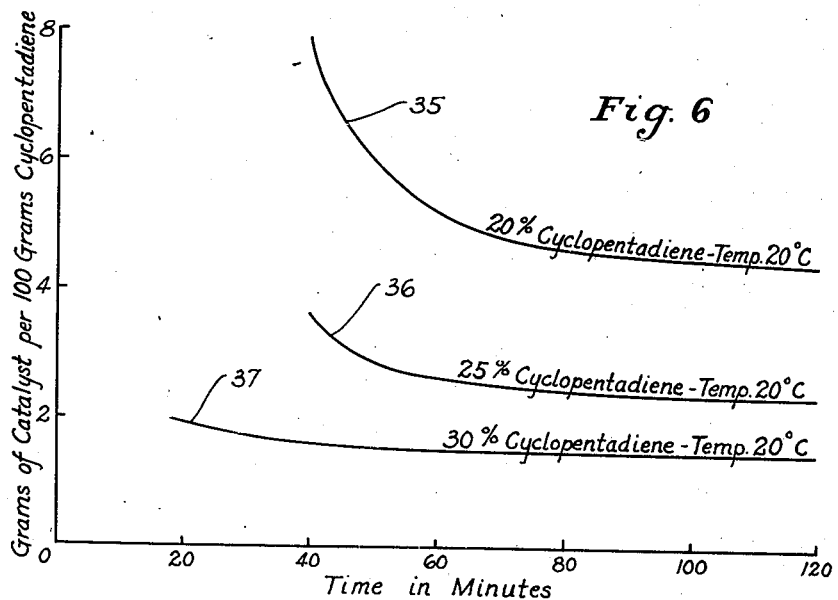
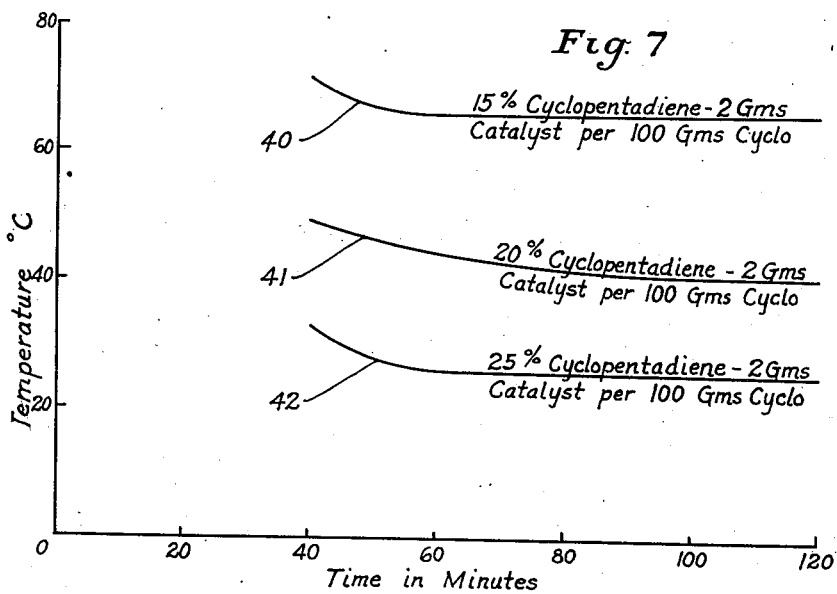

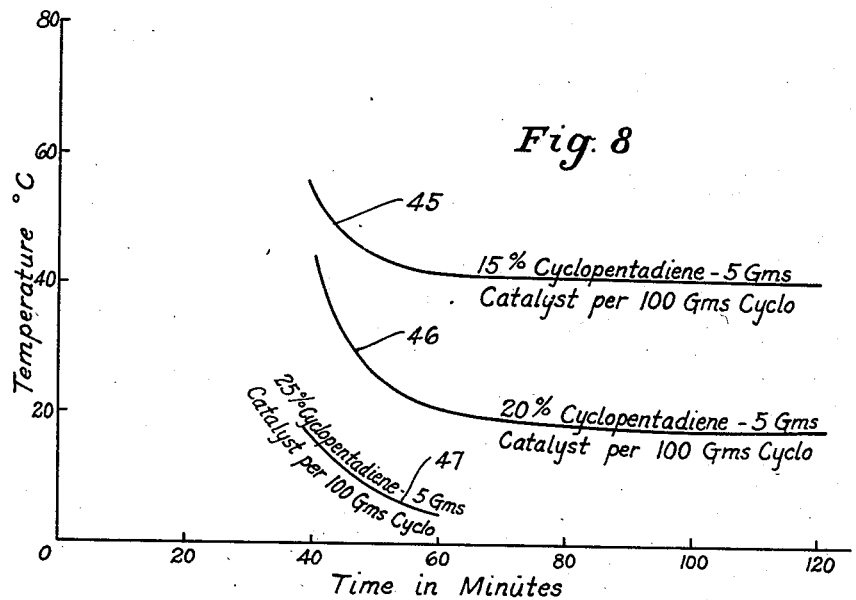
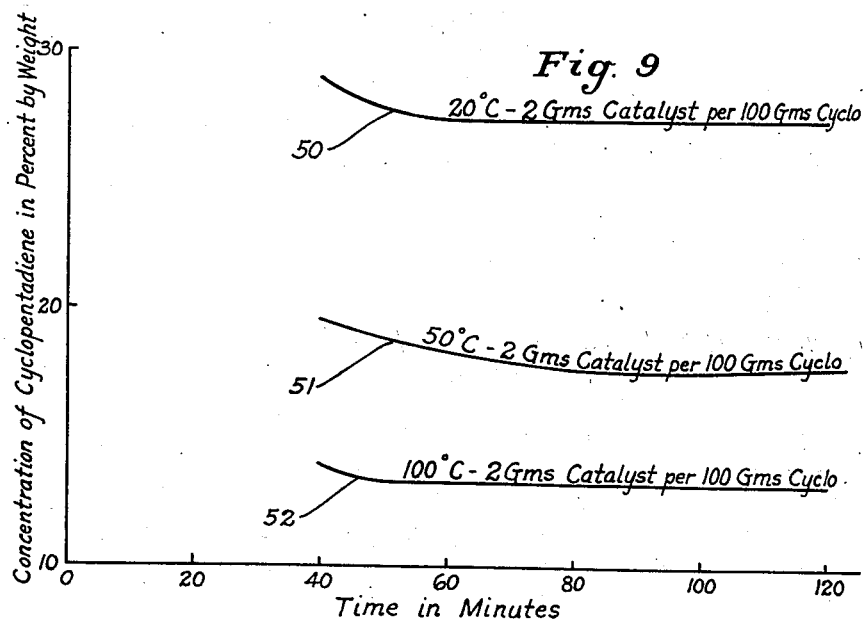

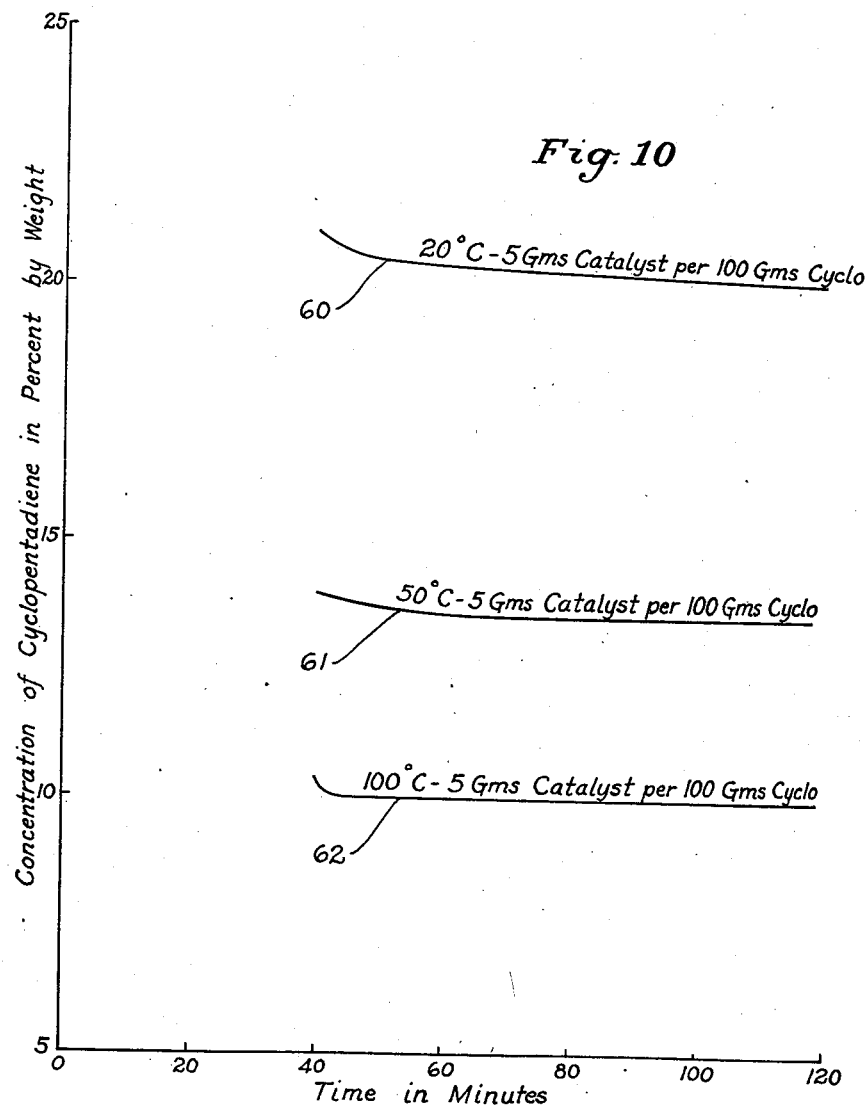

2,359,810

UNITED STATES PATENT OFFICE 2,359,810

POLYMERIZATION OF UNSATURATED COMPOUNDS HAVING THE CYCLOPENTADIENE NUCLEUS

Samuel G. Trepp, Swarthmore, Pa., assignor to The United Gas Improvement Company, a corporation of Pennsylvania Application August 19, 1939, Serial No. 290,931

6 Claims. (Cl. 260—92.6)

This invention pertains generally to the catalytic polymerization of unsaturated compounds such as cyclopentadiene and pertains particularly to the use of boron trifluoride-organic solvent complexes as catalysts.

The invention will be described in connection with the production of cyclopentadiene polymer of a specific type. However, it is to be understood that it may be employed in the production of polymers of other types.

Cyclopentadiene may be polymerized into at least two broad types of polymers one of which is characterized by being soluble in solvents such as benzene, toluene, chloroform, carbon tetrachloride and high flash naphtha, while the other is characterized by being insoluble in these solvents.

The polymerization is usually carried out while the cyclopentadiene is in solution in a solvent.

I have discovered that the soluble type of polymer may be produced with boron trifluoride-organic solvent complexes, and particularly boron trifluoride-ether complexes, by a careful control of the polymerizing reaction.

Examples of boron trifluoride complexes are boron trifluoride-diethyl ether complex, boron trifluoride-dimethyl ether complex, boron trifluoride-phenyl ethyl ether complex, boron trifluoride-phenyl methyl ether complex, boron trifluoride-toluene complex, boron trifluoride-dioxane complex, complexes with dialkyl and aryl alkyl ethers generally, complexes with alcohols generally and complexes with ketones and especially lower ketones generally.

The preparation of complexes of this character in general comprises adding boron trifluoride to the solvent with agitation. If a reaction takes place a definite chemical compound is formed.

There are at least four factors which influence production of soluble polymer. These four factors are (1) temperature, (2) concentration of cyclopentadiene, (3) proportion of uniformly distributed catalyst and (4) time.

Generally speaking, and all other conditions remaining the same, it appears that there is a threshold temperature for the formation of insoluble polymer, and that at all temperatures below this threshold temperature the soluble polymer results. It is recognized that high concentrations of cyclopentadiene and/or high proportions of uniformly distributed catalyst might place this theoretical threshold temperature below commercially obtainable temperature levels. However, for reasonable concentrations of cyclopentadiene and reasonable proportions of uniformly distributed catalyst a threshold temperature can be shown to exist for any given concentration of cyclopentadiene with any given proportion of uniformly distributed catalyst.

Also generally speaking, and all other conditions remaining the same, it appears that there is a threshold concentration of cyclopentadiene for the formation of insoluble polymer, and that at all concentrations below this threshold concentration the soluble form of polymer results. The term "concentration of cyclopentadiene" as used herein and in the claims specifies the percentage by weight of total cyclopentadiene, whether reacted or not, after all of the materials have been combined. It is recognized that inordinately high temperatures and/or inordinately high proportions of uniformly distributed catalyst may make the theoretical threshold concentration difficult of determination. However, for reasonable temperatures and reasonable proportions of uniformly distributed catalyst a threshold concentration of cyclopentadiene can be shown to exist at any given temperature with any given proportion of uniformly distributed catalyst.

Also generally speaking, and all other conditions remaining the same, and assuming that all of the materials have been combined, it appears that there is a threshold proportion of uniformly distributed catalyst for the formation of insoluble polymer, and that with all proportions below this threshold the soluble polymer results. In this connection experiments indicate quite clearly that catalyst is apparently used up during the polymerization of soluble polymer, and that additional catalyst is required to convert the soluble polymer into insoluble polymer. If the proportion of uniformly distributed catalyst is such that there is no catalyst available for the formation of insoluble polymer, none will be formed.

On the other hand, threshold proportions of catalyst are not required to polymerize all of the cyclopentadiene into the soluble polymer, although it will be recognized that a minimum proportion will be required for maximum yields.

It is recognized that inordinately high temperatures and/or inordinately high concentrations of cyclopentadiene may make the theoretical threshold proportion of uniformly distributed catalyst difficult of determination. However, for reasonable temperatures and reasonable concentrations of cyclopentadiene a threshold proportion of uniformly distributed catalyst can be shown to exist at any given temperature with any given concentration of cyclopentadiene.

Also generally speaking, and all other conditions remaining the same, it appears that there is a threshold reaction time for the formation of insoluble polymer, and that for all reaction times below this threshold reaction time the soluble polymer results. It is recognized that low temperatures, low concentrations of cyclopentadiene, and/or low proportions of uniformly distributed catalyst may cause this theoretical threshold reaction time to approach infinity. On the other hand, high temperatures, high concentrations of cyclopentadiene and/or high proportions of uniformly distributed catalyst may cause this theoretical threshold reaction time to approach zero. However, for reasonable temperatures, for reasonable concentrations of cyclopentadiene and/or for reasonable proportions of uniformly distributed catalyst, a threshold reaction time can be shown to exist.

Threshold reaction time, however, differs from the other three factors in that when the threshold reaction time becomes more than one hour the time necessary to form insoluble polymer approaches infinity at a very rapid rate.

When threshold conditions are just exceeded insoluble polymer is formed but not exclusively. This results in a mixture of soluble and insoluble polymers. When exceeding threshold conditions to a greater extent, however, insoluble polymer is formed exclusively. The band over which both soluble and insoluble polymers are formed varies in width with change in conditions. For instance, this band decreases in width with increase in temperature.

Furthermore, the exact values of (1) temperature, (2) concentration of cyclopentadiene, (3) proportion of uniformly distributed catalyst and (4) time at which insoluble polymer begins to appear may vary somewhat with change in purity or source of cyclopentadiene or of catalyst or a change in catalyst or solvent. However, the exact values may be readily determined by test.

The relationship between temperature, concentration of cyclopentadiene, proportion of catalyst and reaction time is more particularly illustrated in the drawings in which:

Figure 1 is a graph on which proportion of catalyst is plotted against concentration of cyclopentadiene at different temperatures, the reaction time being one hour;

Figure 2 is a graph on which temperature is plotted against concentration of cyclopentadiene for different proportions of catalyst, the reaction time being one hour;

Figure 3 is a graph on which proportion of catalyst is plotted against temperature for different concentrations of cyclopentadiene, the reaction time being one hour;

Figure 6 is a graph on which proportion of catalyst is plotted against time for different concentrations of cyclopentadiene, the temperature being 20° C.;

Figure 7 is a graph on which temperature is plotted against time for different concentrations of cyclopentadiene, the proportion of catalyst being 2 grams of catalyst per 100 grams of cyclopentadiene;

Figure 8 is a graph on which temperature is plotted against time for different concentrations of cyclopentadiene, the proportion of catalyst being 5 grams of catalyst per 100 grams of cyclopentadiene;

Figure 4:
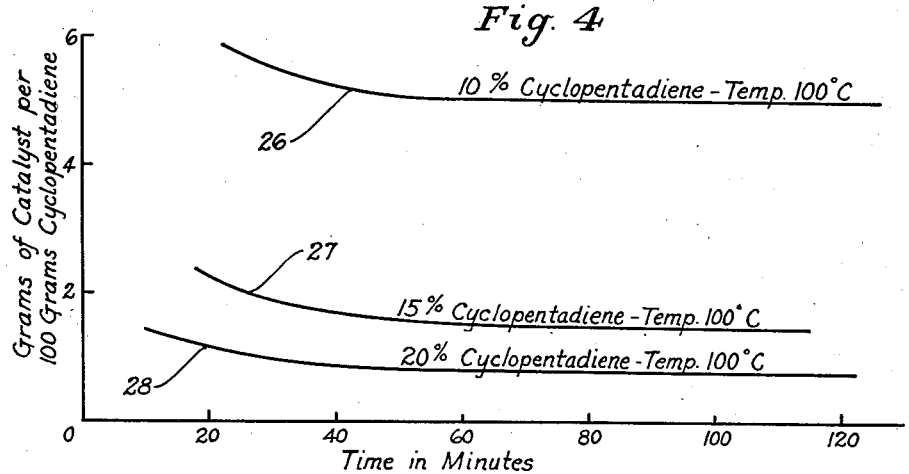
Figure 4 is a graph on which proportion of catalyst is plotted against time for different concentrations of cyclopentadiene, the temperature being 100° C.

Figure 9 is a graph on which concentration of cyclopentadiene is plotted against time for different temperatures, the proportion of catalyst being 2 grams of catalyst per 100 grams of cyclopentadiene; and Figure 10 is a graph on which concentration of cyclopentadiene is plotted against time for different temperatures, the proportion of catalyst being 5 grams of catalyst per 100 grams of cyclopentadiene.

The solvent medium employed in obtaining the data for formulating the curves of Figures 1 to 10 was a commercial grade of toluene, and the catalyst was boron trifluoride-diethyl ether complex.

The boron trifluoride complex employed was titrated with 1.00 Normal NaOH, and 1 cubic centimeter of complex was found to be equivalent to 7.8 cubic centimeters of NaOH, using methyl orange as the indicator.

The refractive index of the cyclopentadiene employed was 1.4448.

The density of the boron trifluoride complex was 1.15.

The above data is given since a change in purity or source of cyclopentadiene or of catalyst or of solvent or a change in catalyst or solvent may shift the curves of the graphs somewhat either horizontally or vertically or both, the curves, however, retaining substantially the same shape.

For instance, when substituting carbon tetrachloride for toluene the shift is vertical to the extent that only approximately 10% of the catalyst requirements with toluene are required when using carbon tetrachloride.

Referring now more particularly to Figure 1, curves 10, 11, 12 and 13 represent threshold conditions or, in other words, boundaries between conditions under which soluble polymer is formed exclusively or substantially so and conditions under which at least a significant amount of insoluble polymer is formed.

The polymerizing reactions were permitted to proceed for one hour, a basis for which will hereinafter appear.

The polymerizing reactions in each case were stopped by the addition of water which hydrolyzed the catalyst, the products of hydrolysis being removed by the addition of alkali and filtering. The same procedure was used in obtaining the data for the graphs of the other figures.

It will be noted that the curves in Figure 1 are displaced to the left and downwardly with increase in temperature. In other words, as proportion of catalyst and/or concentration of cyclopentadiene increase, other conditions remaining the same, the threshold temperature decreases.

There is, of course, a wide area under each curve within which proportion of catalyst and/or concentration of cyclopentadiene may be varied at will. In other words, the area to the left and below any one curve represents conditions under which soluble polymer is formed exclusively or substantially so, and the area above and to the right of that curve represents conditions under which at least some insoluble polymer is formed.

Curve 10 represents threshold conditions at 0° C., curve 11 at 20° C., curve 12 at 50° C., and curve 13 at 100° C.

Curves at other temperatures might be extrapolated if desired.

There is a band or, in other words, a narrow bordering area (not shown) just above and to the right of each curve in which the polymers formed are partly soluble and partly insoluble. Above and to the right of this band the polymer is wholly insoluble.

This band varies in width with change of conditions. For instance, this band decreases in width with increase in temperature.

What has been said with respect to the existence of a band just above and to the right of each curve in which the polymers formed are partly soluble and partly insoluble applies to all of the curves on all of the graphs. This description, therefore, will not be repeated when referring more particularly to the graphs yet to be particularly described.

Referring now to Figure 2, curves 15, 16, 17, and 18 likewise represent threshold conditions.

The polymerizing reactions were stopped at the end of one hour.

It will be noted that the curves are displaced to the left and downwardly with increase in the proportion of catalyst to cyclopentadiene. In other words, as temperature and/or concentration of cyclopentadiene increase, other conditions remaining the same, the threshold proportion of catalyst decreases.

There is, of course, a wide area under each curve within which temperature and concentration of cyclopentadiene may be varied at will.

Curve 15 represents threshold conditions when the proportion of catalyst is 1.5 grams of catalyst per 100 grams of cyclopentadiene, curve 16 when the proportion of catalyst is 3 grams per 100 grams of cyclopentadiene, curve 17 when the proportion of catalyst is 5 grams per 100 grams of cyclopentadiene, and curve 18 when the proportion of catalyst is 8 grams per 100 grams of cyclopentadiene.

Referring now to Figure 3, curves 20, 21, 22, 23, and 24 likewise represent threshold conditions.

The reactions were stopped at the end of one hour.

It will be noted that the curves are displaced to the left and downwardly with increase in concentration of cyclopentadiene. In other words, as proportion of catalyst and/or temperature increase, other conditions remaining the same, the threshold concentration of cyclopentadiene decreases.

There is, of course, a wide area under each curve within which proportion of catalyst and temperature may be varied at will.

Curve 20 represents threshold conditions when the concentration of cyclopentadiene is 10%, curve 21 when the concentration is 15%, curve 22 when the concentration is 20%, curve 23 when the concentration is 25% and curve 24 when the concentration is 30%.

Referring now to Figure 4, curves 26, 27 and 28 likewise represent threshold conditions.

The temperature of the reactions was held at substantially 100° C.

It will be noted that the curves are displaced to the left and downwardly with increase in cyclopentadiene concentration. In other words, as proportion of catalyst and/or time (the latter up to a certain point only) increase, other conditions remaining the same, the threshold concentration of cyclopentadiene decreases.

There is, of course, a wide area under each curve within which proportion of catalyst and/or time may be varied at will.

Curve 26 shows threshold conditions when the concentration of cyclopentadiene is 10%, curve 27 when the concentration is 15%, and curve 28 when the concentration is 20%.

Figure 5:
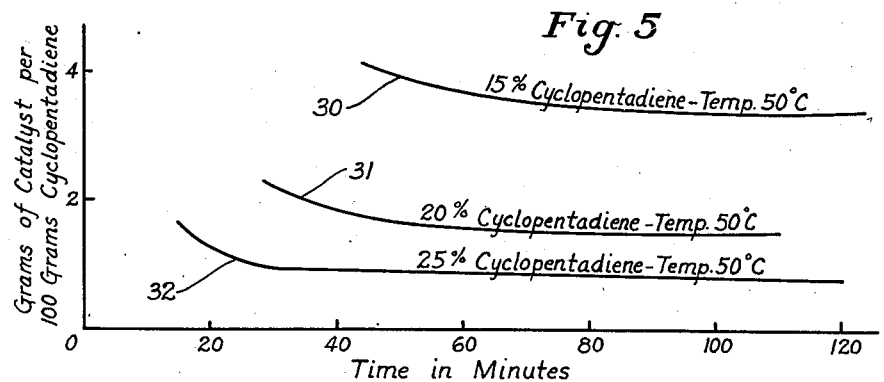
Figure 5 is a graph on which proportion of catalyst is plotted against time for different concentrations of cyclopentadiene, the temperature being 50° C.

Referring now to Figure 5, curves 30, 31, and 32 likewise represent threshold conditions.

The temperature of the reactions was held at substantially 50° C.

It will be noted that the curves are displaced to the left and downwardly with increase in concentration of cyclopentadiene. In other words, and as previously stated in connection with Figure 4, as proportion of catalyst and/or time (the latter up to a certain point only) increase, other conditions remaining the same, the threshold concentration of cyclopentadiene decreases.

There is, of course, a wide area under each curve within which proportion of catalyst and/or time may be varied at will.

Curve 30 shows threshold conditions when the concentration of cyclopentadiene is 15%, curve 31 when the concentration is 20%, and curve 32 when the concentration is 25%.

Referring now to Figure 6, curves 35, 36, and 37 likewise represent threshold conditions.

The temperature of the reactions was held at substantially 20° C.

It will be noted that the curves are displaced to the left and downwardly with increase in cyclopentadiene concentration. In other words, and as previously stated in connection with Figures 4 and 5, as proportion of catalyst and/or time (the latter up to a certain point only) increase, other conditions remaining the same, the threshold concentration of cyclopentadiene decreases.

There is, of course, a wide area under each curve within which proportion of catalyst and/or time may be varied at will.

Curve 35 shows threshold conditions when the concentration of cyclopentadiene is 20%, curve 36 when the concentration is 25%, and curve 37 when the concentration is 30%.

Referring now to Figure 7, curves 40, 41 and 42 likewise represent threshold conditions.

The proportion of catalyst was held at 2 grams of catalyst per 100 grams of cyclopentadiene.

It will be noted that the curves are displaced to the left and downwardly with increase in cyclopentadiene concentration. In other words, as temperature and/or time (the latter up to a certain point only) increase, other conditions remaining the same, the threshold concentration of cyclopentadiene decreases.

There is, of course, a wide area under each curve within which temperature and/or time may be varied at will.

Curve 40 shows threshold conditions when the concentration of cyclopentadiene is 15%, curve 41 when the concentration is 20%, and curve 42 when the concentration is 25%.

Referring now to Figure 8, curves 45, 46, and 47 likewise represent threshold conditions.

The proportion of catalyst was held at 5 grams of catalyst per 100 grams of cyclopentadiene.

It will be noted that the curves are displaced to the left and downwardly with increase in cyclopentadiene concentration. In other words, and as previously stated in connection with Figure 7, as temperature and/or time (the latter up to a certain point only) increase, other conditions remaining the same, the threshold concentration of cyclopentadiene decreases.

There is, of course, a wide area under each curve within which temperature and/or time may be varied at will.

Curve 45 shows threshold conditions when the concentration of cyclopentadiene is 15%, curve 46 when the concentration is 20%, and curve 47 when the concentration is 25%.

Referring now to Figure 9, curves 50, 51, and 52 likewise represent threshold conditions.

The proportion of catalyst was held at 2 grams of catalyst per 100 grams of cyclopentadiene.

It will be noted that the curves are displaced to the left and downwardly with increase in temperature. In other words, as concentration of cyclopentadiene and/or time (the latter up to a certain point only) increase, other conditions remaining the same, the threshold temperature decreases.

There is, of course, a wide area under each curve within which concentration of cyclopentadiene and/or time may be varied at will.

Curve 50 shows threshold conditions at 20° C., curve 51 at 50° C., and curve 52 at 100° C.

Referring now to Figure 10 curves 60, 61 and 62 likewise represent threshold conditions.

The proportion of catalyst was held at 5 grams of catalyst per 100 grams of cyclopentadiene.

It will be noted that the curves are displaced to the left and downwardly with increase in temperature. In other words, and as previously stated in connection with Figure 9, as concentration of cyclopentadiene and/or time (the latter up to a certain point only) increase, other conditions remaining the same, the threshold temperature decreases.

There is, of course, a wide area under each curve within which concentration of cyclopentadiene and/or time may be varied at will.

It will be noted that the curves of Figures 4 to 10 are horizontal or rapidly approach horizontal after the expiration of 60 minutes. It is for this reason that reaction times of one hour were used in obtaining the data for Figures 1 to 3.

The type of soluble polymer obtained varies in physical characteristics with the solvent used during the polymerization. For instance, soluble polycyclopentadienes obtained by polymerizing cyclopentadiene by my new process in solvent naphtha, toluene, or benzene differ somewhat from each other as shown, for example, in the suitability of these polycyclopentadienes for coating metals for which they are unusually well suited. As an illustration, for certain purposes, the benzene polymer is superior, the toluene polymer coming next but being, nevertheless, particularly well suited.

Accordingly, in the preparation of my polymerized cyclopentadiene a solution of cyclopentadiene in a chosen solvent such as toluene is employed.

I use as catalyst one or more boron trifluoride-organic solvent complex and particularly one or more boron trifluoride-ether complex.

The complex catalysts are preferably employed in the form of suspensions, emulsions, or solutions in organic solvents of which benzene, toluene, solvent naphtha and petroleum naphtha are examples. Such suspensions, emulsions, or solutions are formed by adding the catalyst to the solvent followed by stirring. As an example, I find that a concentration of boron trifluoride complex in toluene of 0.2% by weight of toluene is very suitable as a catalyst suspension although any other concentration or solvent suitable for the purpose may be employed.

The reactants should not be combined too rapidly since under such circumstances the reaction may proceed too violently and cause local overheating with the production of insoluble polymer, or undesirable color bodies, or both, which it is proposed to avoid.

While the catalyst may be added to the solution of cyclopentadiene particularly when the catalyst itself is in solution or in suspension in a solvent, I prefer to add the solution of cyclopentadiene to a suspension, emulsion or solution of the catalyst. This affords a more exact control of the amount and distribution of cyclopentadiene undergoing reaction at any one time. The reaction proceeds much more smoothly than when the catalyst is added to the cyclopentadiene. In the latter case no reaction appears to take place until a certain catalyst concentration is reached whereupon the reaction proceeds at a very high rate, and may get out of control.

In either event, however, the addition of one material to the other is preferably accompanied by thorough stirring which is preferably rapid to insure uniform distribution not only of the materials but also of temperature.

In addition the reaction is preferably carried out in apparatus capable of temperature control such as a jacketed vessel provided with an agitator.

A very effective control of the temperature of the reaction and of local superheating is afforded when the preferred procedure is followed.

As an example, the proportion of catalyst may conveniently be between 0.2 to 1.0% by weight of cyclopentadiene provided the temperature of the reaction is controlled and/or the concentration of cyclopentadiene is sufficiently low, thus avoiding the formation of insoluble polymer.

A proportion of catalyst of 0.5% by weight of the total cyclopentadiene present is found to be very convenient. It permits wide variation in temperatures and in concentrations of cyclopentadiene without danger of the formation of insoluble polymer, as shown by the curves of the drawings. Furthermore, there is less likelihood of discoloration of the final product than if a larger proportion of catalyst were used.

Incidentally, it appears that the molecular weight of the resulting soluble polycyclopentadiene may be varied somewhat by varying the proportion of catalyst.

For instance, at all temperatures below 50° C. gel-like polymers are obtained when high proportions of catalyst are employed just below threshold conditions, for instance, within the area to the left and just below the curves of Figures 1, 3, 5, and 6. The ease with which gel-like polymers are obtained increases with decrease in temperature. These polymers are completely soluble.

Incidentally, the formation of gel does not indicate definitely the presence of insoluble polymer as shown above.

Discoloration of the product appears to increase and decrease with increase and decrease in proportion of catalyst so that lower proportions of catalyst yield materials of less discoloration.

Temperatures above 100° C. are preferably avoided and it is recommended that great care be taken to keep the temperatures throughout the reaction below this point.

It is found that temperatures between —40° C. to 70° C. are suitable provided the reactants are sufficiently agitated or other steps taken to avoid local overheating. The preferred temperature range is between —40° C. and 30° C.

Incidentally, it appears that the molecular weight of the resulting soluble polycyclopentadiene may be varied somewhat by varying the temperature.

The increase in color due to increased reaction temperature is quite noticeable at 45° C. and becomes very pronounced as the reaction temperature approaches 100° C.

On the other hand, at 0° C., and even though the proportion of catalyst is fairly high, surprisingly light colored polymers are obtained.

Low reaction temperatures are, therefore, indicated.

Cyclopentadiene solutions of any suitable concentration can be used, keeping in mind what has been said with respect to threshold conditions, although I more often employ concentrations of cyclopentadiene of from 20 to 30% by weight of total reactants.

Incidentally, it appears that the molecular weight of the resulting soluble polycyclopentadiene may be varied somewhat by varying the concentration of cyclopentadiene in the starting material.

Under the recommended conditions the polymer is formed in good yield and with a satisfactory color.

The chosen time for the reaction may vary considerably keeping in mind what has been said about threshold conditions. I find that for practicable purposes and good yields other conditions should be chosen such that the reaction time is somewhere in the neighborhood of the hour or more. This is borne out by the fact that the yield increases with reaction time up to a certain point. The time is, of course, preferably chosen to obtain good yields.

The following specific examples will serve to further illustrate the invention.

1500 pounds of toluene is charged to a small jacketed, brine cooled kettle provided with an agitator and a brine cooled reflux condenser. 3 pounds of boron trifluoride-diethyl ether complex is now charged, agitation is started, and the kettle is cooled to between —10° C., and 5° C.

A suspension of the catalyst in toluene is thus formed in which the catalyst is widely dispersed.

A previously prepared mixture of 525 pounds of cyclopentadiene and 500 pounds of toluene is now gradually added from a mixing tank in which the mixture is maintained at a temperature sufficiently low to prevent the volatilization of the cyclopentadiene. The mixture is preferably below room temperature when it reaches the reaction kettle.

The rate of addition is so regulated that the contents of the reaction kettle are maintained at a temperature below 20° C. to 30° C. while cooling brine is circulated through the jacket.

From 20 to 60 minutes is usually taken for the addition of the cyclopentadiene-toluene mixture depending upon the efficiency of the cooling brine. When addition is complete, the brine flow is cut down so as to keep the temperature above 20° C. but below 30° C. and the product is agitated for at least an additional 2½ hours.

3 pounds of water are now added to hydrolyze and inactivate the catalyst.

After 30 minutes further agitation 15 pounds of quicklime (CaO) were added. The temperature is now kept between 20° C. and 30° C. The addition of quicklime serves to neutralize the halogen acid and to remove any remaining water present.

After an additional agitation of one hour, 30 pounds of a good grade of filter aid, such as diatomaceous earth, is added. This is followed by further agitation for thirty minutes and the product is then pumped through a filter. Any type of filter, such as a plate filter press, centrifuge, etc. might be employed.

The product is approximately a 20% solution of the desired polymer.

The polymer may be used as such, or it may be concentrated in a vacuum still of suitable design to give a product containing any desired higher concentration of polycyclopentadiene, or it might be diluted to give any desired lower concentration, or a second solvent might be substituted such as a higher boiling solvent. This may be done either before or after concentration by adding the second solvent and distilling.

In the above example the particular temperatures were chosen to control the physical properties such as viscosity and color of the product. It will be noted that at no time did the temperature exceed 100° C. or even 70° C. The manner of combining the reactants, constant agitation, and brine cooling made it possible to prevent local overheating, and the formation of insoluble polymer.

The addition of water, or a water solution containing alkali, to hydrolyze the catalyst makes it possible not only to completely remove the activity of the catalyst and thus stop the reaction at any point, but also makes it possible to remove the corrosive and discoloring acid constituents of the catalyst by a suitable alkali. The failure to substantially completely remove the catalyst and its hydrolysis products may be the cause of serious discoloration. The insoluble reaction products formed during the hydrolysis and neutralization remain behind on the filter leaving a highly purified filtrate.

The following is an example of the use of boron trifluoride in the form of a boron trifluoride-toluene complex dispersed in toluene.

0.075 gram of gaseous $BF_3$ are added to 90 grams of toluene with thorough agitation to form the suspension.

A mixture of 30 grams of cyclopentadiene and 30 grams of toluene are added to the $BF_3$-toluene suspension during the course of 12 minutes, the temperature ranging from 30–48° C. during the addition. The mixture is then agitated for an additional hour, after which 1 cubic centimeter of water is added. This is followed by agitation for 15 minutes.

5 grams of quicklime (CaO) are now added to the reaction mixture followed by agitation for an additional hour.

5 grams of a suitable filter aid are then added, and the mixture filtered.

122.5 grams of a 15.3% solution of polycyclopentadiene are thus obtained.

Generally speaking, any other boron trifluoride-organic solvent complex might be substituted.

In the above specific examples, both the cyclopentadiene and the catalyst were in diluted form before addition. Furthermore, as pointed out above, diluted cyclopentadiene is preferably added to diluted catalyst rather than vice versa to afford a better control of the speed and uniformity of the reaction and of the amount of heat evolved and consequently the type of polymer produced. The reaction runs smoother and is much more easily controlled on a large scale.

In the above examples (1) temperature, (2) concentration of cyclopentadiene, (3) proportion of uniformly distributed catalyst, and (4) reaction time may be varied considerably in the production of soluble polymer having in mind what has been said with respect to threshold conditions. If it is found that insoluble polymer is obtained, one or more of the four conditions, namely (1) temperature, (2) concentration of cyclopentadiene, (3) proportion of catalyst, and (4) reaction time should be reduced until the soluble polymer is obtained.

Carrying out the polymerization in the presence of a solvent makes it possible to have any desired concentration of cyclopentadiene.

It is to be noted that my process is of some utility for making soluble polymer even though insoluble polymer is simultaneously formed, provided, of course, that all of the unsaturate content is not converted into insoluble polymer. When insoluble polymer is formed along with soluble polymer, the insoluble polymer is separated during the filtering step, the soluble polymer remaining in solution in the solvent or solvent mixture originally employed as a diluent.

While in the above examples no dilution of the product was required to facilitate hydrolysis and/or filtering, it is to be understood that dilution with a solvent may be employed, if desired, particularly in the case of highly viscous products.

Generally speaking, for the formation of soluble polymer to the exclusion of insoluble polymer and/or extreme discoloration, temperatures should rarely exceed 100° C. and preferably should not exceed 70° C., concentrations of cyclopentadiene should rarely exceed 50% by weight of the total solution except possibly at low temperatures, and proportion of uniformly distributed catalyst to cyclopentadiene should rarely exceed 5.0% by weight of cyclopentadiene with from 15 to 20% as a top limit.

It should be kept in mind that there are for practical purposes minimum values for temperature, concentration of cyclopentadiene, proportion of catalyst and time, which practice will show ought to be exceeded to obtain reasonable yields. For instance, I find that when using ordinary commercial toluene as the solvent a certain quantity of boron trifluoride-ether complex per 100 grams cyclopentadiene is required before the reaction will commence. On the other hand, if the maximum values given in the previous paragraph for temperature, catalyst and cyclopentadiene were used simultaneously, some insoluble polymer might be formed, even though the reaction time chosen were as short as practice would permit.

It is by the observance of the preferred principles set forth herein that a quality product is produced in good yield.

While in the above specific examples, toluene is used as a polymerization medium, it is to be understood that any other solvent might be substituted of which benzene, xylene, ethyl benzene, solvent naphtha, petroleum naphtha, carbon tetrachloride, and ethylene dichloride are examples. The products with benzene and toluene are preferred for specific uses as hereinafter referred to.

Although in the above particular description both reactants, namely, catalyst and unsaturated compound, are diluted prior to their admixture, it is to be understood that variations are possible. For instance, it is conceivable that all of the diluent may be first mixed with one of the reactants (either catalyst or unsaturated compound) and that the other reactant may be added in concentrated form, particularly if the principles set forth herein are closely observed. Or the larger part of the diluent may be added to one of the reactants so that the other is relatively concentrated. It is also conceivable that, with the exercise of extreme care and the closest adherence to the principles set forth herein, both reactants might possibly be employed in relatively concentrated form. Other variations are possible. When adding one liquid to another with agitation, I find it convenient and often preferable to do this below the surface of one of the liquids.

Any other suitable alkali such as sodium hydroxide, sodium bicarbonate, magnesium hydroxide, an amine or other basic substance might be substituted for quicklime in the above specific example, followed by a non-acidic drying agent such as $Na_2SO_4$, or soda lime. Both neutralization and drying is effected by CaO.

The product may be used for many purposes, for instance, for lacquers generally, for varnishes either alone or in admixture with other resins, for enamels, for paints, or in fact for coating compositions generally. It is ideally suited to the coating of metals, for instance, for the coating of food containers as described and claimed in copending application Serial Number 291,007, filed Aug. 19, 1939, by Newcomb K. Chaney. This is especially true of the products polymerized in benzene and toluene.

It is possible to obtain soluble polycyclopentadiene of higher viscosity or of otherwise changed characteristics by starting with a solution of soluble polycyclopentadiene and stopping the reaction before threshold conditions are exceeded.

While the invention has been particularly described in connection with the homo-polymerization of cyclopentadiene, it is to be understood that it is applicable to the homo-polymerization of methyl cyclopentadiene. However, it is to be understood that the polymer particularly described has certain unique characteristics which distinguish it from polymers prepared from other starting materials. The invention is also applicable to the co-polymerization of cyclopentadiene with methylcyclopentadiene. All other unsaturates which are polymerizable under the conditions obtaining during my polymerization step are preferably excluded to avoid co-polymerization therewith.

It is to be understood that the above specific examples are by way of illustration. Therefore, changes, omissions, additions, substitutions, and/or modifications might be made within the scope of the claims without departing from the spirit of the invention which is intended to be limited only as required by the prior art.

This application is a continuation in part of my copending application Serial Number 194,523, filed March 8, 1938.

I claim:

1. A process for producing a benzene-soluble polymer of cyclopentadiene by the catalytic polymerization thereof in the substantial absence of other compounds polymerizable under the conditions obtaining, comprising admixing cyclopentadiene, a solvent, and a hydrolyzable boron trifluoride-organic solvent complex previously formed by reacting boron trifluoride with an organic solvent capable of reacting with boron trifluoride to form said hydrolyzable complex; and preventing the polymerization of said cyclopentadiene from being effected entirely to benzene-insoluble polycyclopentadiene by thoroughly agitating the reaction mass while maintaining the reaction temperature below 70° C., the concentration of said cyclopentadiene below 50% by weight, and the proportion of catalyst to said cyclopentadiene below 5% by weight, and by stopping the reaction by inactivating said catalyst while benzene-soluble polycyclopentadiene is present in the reaction mass.

2. A process for producing benzene-soluble polycyclopentadiene by the catalytic polymerization of cyclopentadiene in the substantial absence of all other compounds polymerizable under the conditions obtaining, comprising mixing with said cyclopentadiene in the presence of a solvent to effect said polymerization in considerable proportion to polycyclopentadiene a hydrolyzable boron trifluoride-organic solvent complex previously formed by reacting boron trifluoride with an organic solvent capable of reacting with boron trifluoride to form said hydrolyzable complex; and preventing the polymerization of said cyclopentadiene from being effected entirely to benzene-insoluble polycyclopentadiene by thoroughly agitating the reaction mass while maintaining the reaction temperature below 100° C., the concentration of said cyclopentadiene below 50% by weight, and the proportion of catalyst to said cyclopentadiene below 20% by weight, and by stopping the reaction by inactivating said catalyst while benzene-soluble polycyclopentadiene is present in the reaction mass.

3. A process for producing benzene-soluble polycyclopentadiene by the catalytic polymerization of cyclopentadiene in the substantial absence of all other compounds polymerizable under the conditions obtaining, comprising mixing with said cyclopentadiene in the presence of a solvent to effect said polymerization in considerable proportion to polycyclopentadiene a hydrolyzable boron trifluoride-organic solvent complex previously formed by reacting boron trifluoride with an organic solvent capable of reacting with boron trifluoride to form said hydrolyzable complex; and preventing the polymerization of said cyclopentadiene from being effected largely to benzene-insoluble polycyclopentadiene by thoroughly agitating the reaction mass while maintaining the reaction temperature below 45° C., the concentration of said cyclopentadiene below 50% by weight, and the proportion of catalyst to said cyclopentadiene below 5% by weight, and by stopping the reaction by inactivating said catalyst while benzene-soluble polycyclopentadiene is the preponderant polymer present in the reaction mass.

4. A process for producing benzene-soluble polymer by the catalytic polymerization of a cyclic diene selected from the group consisting of cyclopentadiene and methyl cyclopentadiene in the substantial absence of other compounds polymerizable under the conditions obtaining, comprising mixing with said cyclic diene in the presence of a solvent a hydrolyzable boron trifluoride-organic solvent complex previously formed by reacting boron trifluoride with an organic solvent capable of reacting with boron trifluoride to form said hydrolyzable complex, and preventing the polymerization of said cyclic diene from being effected entirely to benzene-insoluble polymer by thoroughly agitating the reaction mass while maintaining the reaction temperature below 100° C., the concentration of said cyclic diene below 50% by weight, and the proportion of catalyst to said cyclic diene below 20% by weight, and stopping the reaction by inactivating said catalyst while benzene-soluble polymer is present in the reaction mass.

5. A process for producing benzene-soluble polymer by the catalytic polymerization of a cyclic diene selected from the group consisting of cyclopentadiene and methyl cyclopentadiene in the substantial absence of other compounds polymerizable under the conditions obtaining, comprising mixing with said cyclic diene in the presence of a solvent a hydrolyzable boron trifluoride-organic solvent complex previously formed by reacting boron trifluoride with an organic solvent capable of reacting with boron trifluoride to form said hydrolyzable complex, and preventing the polymerization of said cyclic diene from being effected entirely to benzene-insoluble polymer by thoroughly agitating the reaction mass while maintaining the reaction temperature below 70° C., the concentration of said cyclic diene below 50% by weight, and the proportion of catalyst to said cyclic diene below 5% by weight, and stopping the reaction by inactivating said catalyst while benzene-soluble polymer is present in the reaction mass.

6. A process for producing benzene-soluble polymer by the catalytic polymerization of a cyclic diene selected from the group consisting of cyclopentadiene and methyl cyclopentadiene in the substantial absence of other compounds polymerizable under the conditions obtaining, comprising mixing with said cyclic diene in the presence of a solvent a hydrolyzable boron trifluoride-organic solvent complex previously formed by reacting boron trifluoride with an organic solvent capable of reacting with boron trifluoride to form said hydrolyzable complex, and preventing the polymerization of said cyclic diene from being effected entirely to benzene-insoluble polymer by thoroughly agitating the reaction mass while maintaining the reaction temperature below 45° C., the concentration of said cyclic diene below 50% by weight, and the proportion of catalyst to said cyclic diene between 0.2% and 1% by weight, and stopping the reaction by inactivating said catalyst while benzene-soluble polymer is present in the reaction mass.

SAMUEL G. TREPP.